United States Patent [19]

Narayana et al.

[11] Patent Number: 5,118,482
[45] Date of Patent: Jun. 2, 1992

[54] PROCESS FOR REALUMINATING ZEOLITES

[75] Inventors: Mysore Narayana; Brendan D. Murray, both of Houston, Tex.

[73] Assignee: Shell Oil Company, Houston, Tex.

[21] Appl. No.: 374,376

[22] Filed: Jun. 30, 1989

[51] Int. Cl.$^5$ .............................................. C01B 33/34
[52] U.S. Cl. .................................. 423/328; 423/329; 502/63; 502/85; 502/86
[58] Field of Search ............... 423/118, 326, 328, 329; 502/85, 86, 77, 63

[56] References Cited

U.S. PATENT DOCUMENTS

| | | | |
|---|---|---|---|
| 4,427,788 | 1/1984 | Miale et al. | 502/77 |
| 4,468,475 | 8/1984 | Kuehl | 502/85 |
| 4,477,582 | 10/1984 | Miale | 502/77 |
| 4,478,950 | 10/1984 | Chu | 502/85 |
| 4,513,091 | 4/1985 | Chang | 502/71 |
| 4,550,092 | 10/1985 | Chang et al. | 502/85 |
| 4,563,435 | 1/1986 | Chu et al. | 502/85 |
| 4,594,333 | 6/1986 | Chang et al. | 502/85 |
| 4,837,398 | 6/1989 | Chang et al. | 502/86 |
| 4,871,702 | 10/1989 | Chang et al. | 502/86 |
| 4,943,545 | 7/1990 | Chang et al. | 502/85 |

FOREIGN PATENT DOCUMENTS 0134332 8/1983 European Pat. Off. .

OTHER PUBLICATIONS

Liu et al., "Hydrothermal Isomorphous Insertion of Aluminium into the Framework of Zeolite Y: A Convenient Method of Modifying the Siting of Al and Si in Faujastic Catalyst," J. Chem. Soc. Commun., pp. 582–584, 1986.

Bexman, "On the Efficiency of Insertion of Aluminium into the Framework of Y-type Zeolite by the Hydrothermal Process of Liu, Klinowski, and Thomas," J. Chem. Soc., Chem. Commun., p. 1562, 1987.

Sulikowski, "Structural and Catalytic Consequences of Isomorphous Substitution of Silicon by Aluminium and vice versa in the Framework of Pentasil Zeolites," J. Chem. Soc., Chem. Commun., p. 1521, 1987.

Breek et al, "Zeolite Chemistry IV—Evidence for the Elimination and Subsequent Reinsertion of Framework Aluminum During the Stabilization of $NH_4^+$-Exchanged Zeolite X," Proceedings of the Fifth International Conference on Zeolites, pp. 335–343, 1980.

Engelhardt et al., "A Reexamination of the Hypothesis of Breck and Skeels Concerning the Reinsertion of Aluminum in the Framework of Dealuminated Y Zeolites," J. of Catalysis 88, pp. 513–515, 1984.

Chang et al., "Insertion of Aluminium into High-silica-content Zeolite Framework," J. Chem. Soc., Faraday Trans. I, 81, pp. 2215–2224, 1985.

Anderson, et al., "Alumination of Highly Siliceous Zeolites," J. Chem. Soc., Chem. Commun., pp. 1596–1597, 1984.

*Primary Examiner*—R. Bruce Breneman

[57] ABSTRACT

The instant invention comprises a process for increasing the framework aluminum content of a framework aluminum deficient zeolite containing non-framework aluminum by contacting said zeolite with an aqueous basic solution at a temperature greater than about 25° C. Preferably the aqueous solution comprises ammonium and/or alkali metal hydroxides dissolved in water and the contact temperature ranges between about 60° C. and about 90° C. The instant invention also relates to the zeolites thus prepared by the instant process.

9 Claims, 2 Drawing Sheets

PROCESS FOR REALUMINATING ZEOLITES

FIELD OF THE INVENTION

This invention relates to a process for realuminating zeolites, thereby reducing their silica to alumina ratio. This invention further relates to the zeolites thus produced.

BACKGROUND OF THE INVENTION

It is well known that the aluminum content of a zeolite determines to a great extent its properties such as catalytic activity, sorption and ion-exchange capacity. It is also well known that the aluminum content of various zeolites can be decreased by various methods such as acid leaching, $SiCl_4$ treatment, and hydrolysis. However, increasing the framework aluminum content of a freshly synthesized or a dealuminated zeolite has been a controversial issue [see D. C. Breck and G. W. Skeels, Proc. 5th Int. Conf. on Zeolites, p. 335(1980) and G. Englehardt and U. Lohse, J. Catal. 88, 513 (1984)] for the past several years and only recently have some techniques emerged. Recent literature reports claim that aluminum can be substituted for silicon in highly siliceous ZSM-5 by prolonged treatment with $AlCl_3$ vapor or with alumina at elevated temperatures. [see C. D. Chang, et al., J. C. S. Faraday I, 81,2215 (1985) and M. W. Anderson, J. Klinowski and X. Liu, J. C. S. Chem. Comm., 1596(1984)].

The present invention provides a convenient and inexpensive method for increasing the framework aluminum content of either freshly synthesized or dealuminated zeolites.

SUMMARY OF THE INVENTION

The instant invention comprises a process for increasing the framework aluminum content of a framework aluminum deficient zeolite containing non-framework aluminum by contacting said zeolite with a basic aqueous solution at a temperature preferably greater than about 25° C. In a preferred embodiment the aqueous solution comprises ammonium and/or alkali metal hydroxides dissolved in water and the contact temperature range between about 60° C. and about 90° C. The instant invention also relates to the zeolites thus prepared by the instant process.

The instant compositions are useful as catalysts, catalyst supports, adsorbents and ion exchange materials.

DETAILED DESCRIPTION OF THE INVENTION

Figure 1:
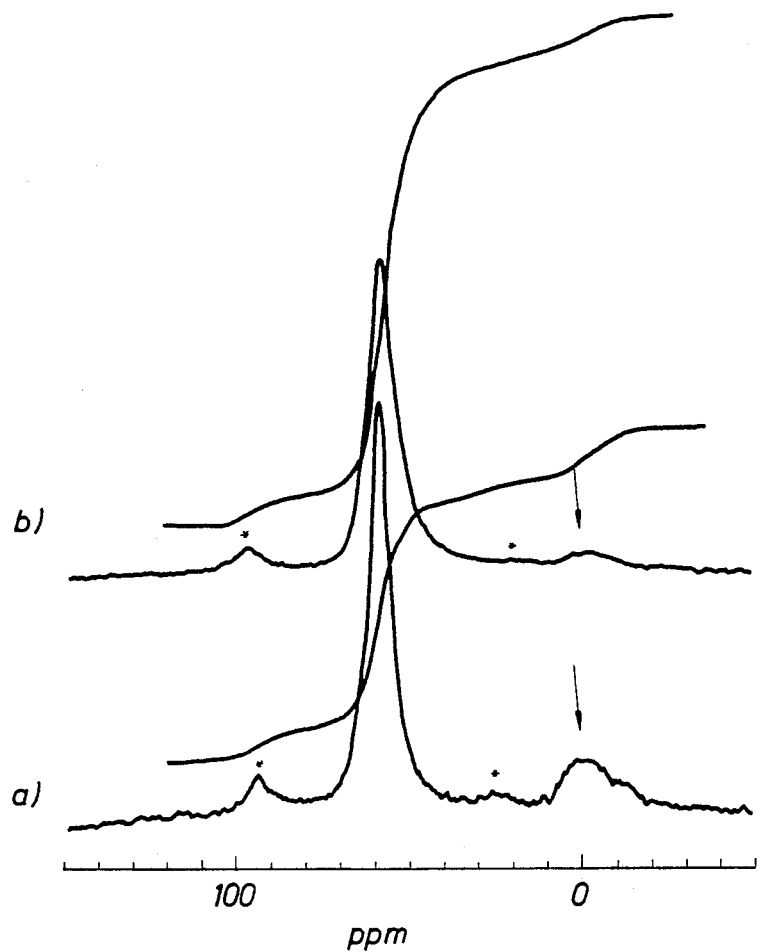
FIG. 1 represents the $^{27}Al$ NMR spectra of a Y zeolite before (curves a) and after (curves b) treatment with ammonium hydroxide solution.

Zeolites are crystalline aluminosilicates that possess a cage-network structure with pores a few angstroms in diameter. Some of the common materials, such as zeolite Y (faujasite) or zeolite A have a three dimensional structure with pore intersections ("supercages") somewhat larger than the pore size. Others such as zeolite L have channels with diffusional cross connections. For each type of zeolite a theoretical crystal structure or "framework" can be specified which is composed of interconnected silicon atoms, aluminum atoms and oxygen atoms arranged in an ordered fashion. The aluminum found within this framework is referred to as "framework aluminum". A typical zeolitic framework comprises corner-sharing $SiO_4$ and $AlO_4$ tetrahedra. Charge deficiencies in the Si-O-Al framework are balanced by the presence of suitable positive ions such as ions of hydrogen, ammonium, alkali metal, alkaline earth metal, rare earth metal, etc. Each specific zeolite will have either a specific Si to Al ratio or specified range of Si to Al ratios that correspond to the theoretical crystal structure of such zeolite type. There are many processes, such as acid leaching, $SiCl_4$ treatment, and hydrolysis, that when applied to a zeolite cause a physical removal of the aluminum from the framework of the zeolitic crystal structure which results in an increase in the Si to Al ratio and a corresponding change in the unit cell size. Alternatively, in the original synthesis of the zeolites, certain organo-template molecules, such as certain amines, can by utilized to produce zeolites of a given type but having differing Si to Al ratios depending upon the amines utilized. Since the Si to Al ratio can affect the catalytic activity, sorption and ion-exchange capacity of a zeolite, techniques to fine tune the Si to Al ratio can be very important. The instant process provides a means whereby the Si to Al ratio can be lowered.

The term "framework aluminum deficient zeolite" refers to a zeolite having a Si to Al ratio in excess of the lowest theoretically possible ratio. Thus, framework aluminum deficient zeolites can have their $SiO_2/Al_2O_3$ ratios lowered by reinsertion of aluminum into the framework.

The term "non-framework aluminum" refers to aluminum that is not located in the framework of crystal structure of the zeolite, but is located elsewhere in the zeolite, such as in the pores and/or the supercages. This non-framework aluminum will normally be in ionic or compound form. When ion-exchanged into the zeolite, the non-framework aluminum will frequently be found to have an octahedral coordination.

Essentially any crystalline zeolitic aluminosilicate can be utilized in the instant process to prepare the compositions of the instant invention. The zeolites can include both synthetic and naturally occurring zeolites. Illustrative of the synthetic zeolites are Zeolite X, U.S. Pat. Nos. 2,882,244; Zeolite Y, 3,130,007; Zeolite A, 2,882,243; Zeolite L, Bel. 575,117; Zeolite D, Can. 611,981; Zeolite R, 3,030,181; Zeolite S, 3,054,657; Zeolite T, 2,950,952; Zeolite Z, Can. 614,995; Zeolite E, Can. 636,931; Zeolite F, 2,995,358; Zeolite O, 3,140,252; Zeolite W, 3,008,803; Zeolite Q, 2,991,151; Zeolite M, 2,995,423; Zeolite H, 3,010,789; Zeolite J, 3,001,869; Zeolite W, 3,012,853; Zeolite KG, 3,056,654; Zeolite SL, Dutch 6,710,729; Zeolite Omega, Can. 817,915; Zeolite ZK-5, 3,247,195; Zeolite Rho, Proc. Sixth Intern. Zeolite Conf., Olson and Bisio, eds., 812–822, 1983; Zeolite Beta, 3.308,069; Zeolite ZK-4, 3,314,752; Zeolite ZSM-5, 3,702,886; synthetic mordenite; the so-called ultrastable zeolites of U.S. Pat. Nos. 3,293,192 and 3,449,070; and the references cited therein, incorporated herein by reference. Other synthetic zeolites are described in the book "Zeolite Molecular Sieves-Structure, Chemistry and Use," by Donald W. Breck, 1974, John Wiley & Sons, incorporated by reference herein. Illustrative of the naturally occurring crystalline zeolites are analcime, bikitaite, edingtonite, epistilbite, levynite, dachiardite, erionite, faujasite, analcite, paulingite, noselite, ferrierite, heulandite, scolecite, stilbite, clinoptilolite, harmotone, phillipsite, brewsterite, flakite, datolite, chabazite, gmelinite, cancrinite, leucite, lazurite, scolecite, mesolite, ptilolite, mordenite, nepheline, natrolite, scapolite, thomsonite, gismondine, garronite, gonnardite, merlinolite, laumontite, levynite, offretite, yugawaralite. Descriptions of certain naturally occurring zeolites are found in the aforementioned book by Breck, in the book "Molecular Sieves-Principles of Synthesis and Identification", R. Szostak, Van Nostrand Reinhold, New York, 1989, both incorporated by reference herein, and in other known references. These zeolites may be in the hydrogen form or may be partially or fully exchanged with ammonium or metal ions.

The zeolite to be processed by the instant invention must meet two requirements. First, it must be aluminum deficient, that is, it must be capable of existing in a state having a lower Si to Al ratio. This requirement can be be met either in the original synthesis of the zeolite or by treating the zeolite with known processes in order to increase its Si to Al ratio. See, for example, Scherzer, "The Preparation and Characterization of Aluminum-Deficient Zeolites", ACS Symp. Ser. 248, 156–199(1984), for a description of methods of synthesizing aluminum-deficient zeolites. Second, it must contain non-framework aluminum present. It is this non-framework aluminum that is converted to framework aluminum by the instant process. Certain of the known processes for increasing the Si to Al ratio of the zeolite can leave a residue of non-framework aluminum within the pores and/or supercages of the zeolite. It is this non-framework aluminum in these materials that is at least in part converted to the framework aluminum by the instant process. Alternatively, non-framework aluminum can be intentionally added to the zeolite by suitable techniques, such as, for example, impregnation and ion-exchange techniques. Framework and non-framework aluminum can be detected and distinguished by spectroscopic techniques, such as NMR.

The impregnation techniques that are used to add non-framework aluminum to the zeolite are conventional. Typically, a suitable aluminum compound or salt is dissolved in a suitable solvent and resulting solution is impregnated into the zeolite. The impregnation may be single or multiple. Preferred is the so-called "dry impregnation" wherein just that amount of solution is utilized that will just fill the pores of the zeolite. A preferred impregnating solution comprises one or more aluminum salts dissolved in water. Non-limiting examples of these salts include acetate, bromate, bromide, chlorate, chloride, fluoride, nitrate, stearate, sulfate, etc. Organo-aluminum compounds can also be used dissolved in suitable solvents. Non-limiting examples of organo-aluminum compounds include the alkyls such as trimethylaluminum, triethylaluminum and tri-n-butyl aluminum; the alkyl aluminum halides such as diethylaluminum chloride and dimethylaluminum bromide., the alkoxides such aluminum isopropoxide, aluminum ethoxide and aluminum methoxide. These organo-aluminum compounds are dissolved in suitable organic solvents such as alkanes, ketones, ethers, sulfoxides, etc. After impregnation the zeolite is dried to remove the solvent. Mild calcination may also follow.

Non-framework aluminum can also be added by ion-exchange techniques which are conventional. The zeolite is contacted one or more times with an aqueous solution of a soluble aluminum salt(s) to effect an exchange with other positive ions present in the zeolite. Suitable salts are those noted above as suitable for aqueous impregnation. After ion exchange the zeolite is dried to remove the solvent. Mild calcination may also follow.

Non-framework aluminum in the zeolite is converted to framework aluminum according to the process of the instant invention by contacting the zeolite with an aqueous solution of basic salts. Suitable salts include ammonium hydroxide, the alkali metal hydroxides and the alkaline earth metal hydroxides. Time and temperature of contact are not critical to this invention, but do affect the degree of conversion of non-framework aluminum to framework aluminum. Longer contact times and higher contact temperatures affect a higher conversion. Preferred temperatures are in excess of about 30° C., preferably in excess of about 50° C. up the to boiling point of the solution. Most preferred contact temperatures range from about 60° C. to about 90° C. Contact pressures are typically atmospheric, although higher and lower pressures can be used. Contact times preferably are greater than about 0.1 hours and more preferably greater than about 1 hours. The pH of the base solution is not critical but will typically be greater than about 8.5, preferably greater than about 9 and more preferably greater than about 9.5. However, the pH of the solution should not be so high that the solution attacks the structure of the zeolite. This upper limit will be dependent upon the particular type of zeolite utilized. Generally the upper pH will be about 13, more preferable about 12.5, and more preferably about 12. The pH will thus range between about 8.5 and 13, more preferable between about 9 and 12.5 and even more preferably between about 9 and 12. After contact, the zeolite is washed with water one or more times to remove a substantial portion to the base solution. The zeolite may then be dried to remove residual water.

An aqueous solution of ammonium hydroxide is a preferred solution to be utilized for realumination of zeolites according to the instant process. When other basic salts, such as the alkali metal salts, are utilized in the realuminating solution and when the hydrogen-form of the zeolite is desired as the final product, additional process steps, such as ammonium ion exchange followed by calcining, must be used to obtain the hydrogen-form zeolite.

The ranges and limitations provided in the instant specification and claims are those which are believed to particularly point out and distinctly claim the instant invention. It is, however, understood that other ranges and limitations that perform substantially the same function in substantially the same way to obtain the same or substantially the same result are intended to be within the scope of the instant invention as defined by the instant specification and claims.

The invention will be described by the following examples which are provided for illustration purposes and are not to be construed as limiting the invention.

ILLUSTRATIVE EMBODIMENTS

In the following experiments NMR spectra were obtained with a Bruker CXP-200/400 spectrometer using a Chemagnetics probe. Silicon NMR with proton decoupling were obtained at 39.5 MHz and without proton decoupling at 79.5 MHz. All of the aluminum NMR spectra were obtained at 104.3 MHz without proton decoupling. The samples were loaded into 9.5 mm DELRIN rotors and spun at the magic angle. Spinning speeds of 3 to 4 KHz were used. Suprasil quartz tubes were used to obtain the NMR spectra of the filtrates obtained immediately after the base treatment.

ILLUSTRATIVE EMBODIMENT I

Realumination of Y Zeolites

Several Y zeolites with $SiO_2/Al_2O_3$ ratios ranging from 3 to 16 which were manufactured using high temperature steam calcination and which contained non-framework aluminum were used in this example. Typically 0.3–0.5 grams of zeolite were slurried with 5 to 10 ml of an aqueous base solution which was prepared by adding either sodium hydroxide or potassium hydroxide to yield a base concentration of 0.025M. Ammonium hydroxide solutions were prepared by adding 0.8 to 1.0 ml of 30% ammonium hydroxide to 7.0 ml of deionized water. The basic solution was added to the zeolite solid, slurried and maintained at 70°–80°0 C. for 16 hours. Typical pH of the zeolite slurry ranged from 10.5 to 12. Identical results were obtained upon adding 1.0 ml of 30% ammonium hydroxide to the zeolite slurried in 4–8 ml of deionized water. After the treatment, the zeolite was filtered and the filtrate was retained for NMR experiments. The filtered solid was washed three times with hot deionized water, filtered and air dried either at ambient temperature or in an oven at 80° C.

FIG. 1 shows the $^{27}Al$ NMR spectra of a Y zeolite before (curves a) and after (curves b) treatment with the $NH_4OH$ solution. The first three peaks seen in FIG. 1a from left to right correspond to aluminum in the framework of the zeolite at +60 ppm (referenced to $Al^{3+}(-H_2O)_6$ in an aqueous aluminum chloride solution at 0.0 ppm) and its spinning side bands at +95 and +30 ppm respectively. The sidebands are marked with an asterisk in the Figure. The fourth peak at −0.5 ppm (marked with the arrow) corresponds to the non-framework aluminum in the zeolite. From the integrated intensities of the observed peaks, the amount of non-framework aluminum in the untreated zeolite was estimated to be about 18% of the total aluminum observed by NMR and in the base treated zeolite to be about 6% of the total aluminum observed by NMR. It was assumed that the intensity due to other than $+\frac{1}{2}$ to $-\frac{1}{2}$ transitions was negligible. The filtrate itself did not show any aluminum NMR thus precluding the possibility that the non-framework aluminum was leached out. This was further checked by slurrying the zeolite in only water at 80° C. for 16 hours. The aluminum NMR of such a sample was identical to that of an untreated zeolite.

Figure 2:
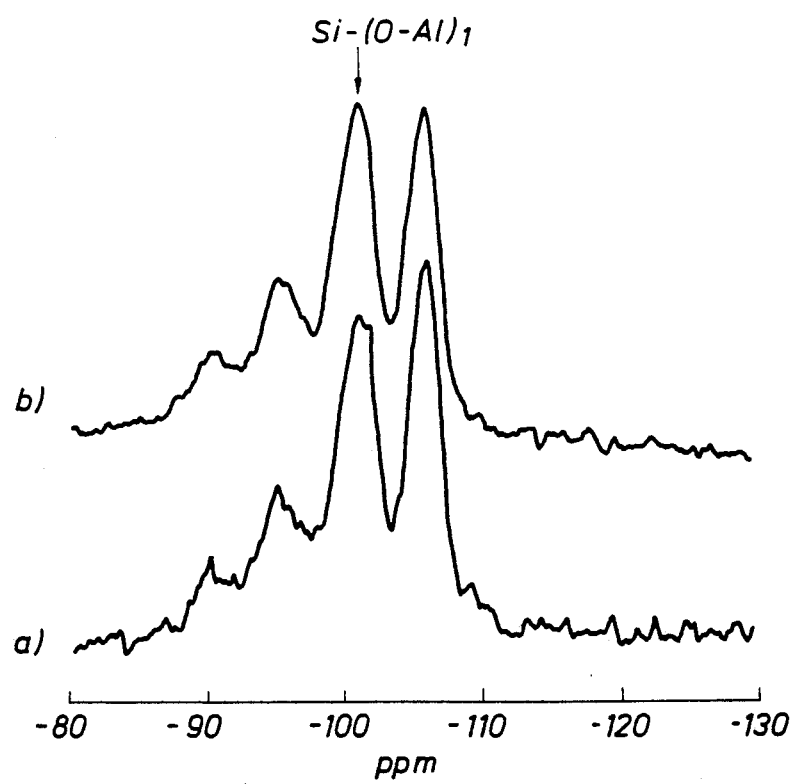
FIG. 2 represents the $^{29}Si$ NMR spectra of a Y zeolite before (curve a) and after (curve b) treatment with ammonium hydroxide.

FIG. 2 shows the $^{29}Si$ NMR spectra of the Y zeolite before (curve a) and after (curve b) treatment with $NH_4OH$ solution. A brief explanation of the silicon NMR spectra of zeolites is in order. The four peaks seen in the silicon spectra correspond to silicons having different number n' of aluminum ions in the second coordination sphere, with n' decreasing from left to right. Thus the peak at −90 ppm (with reference to external tetramethyl silane at 0.0 ppm) corresponds to a framework silicon with three aluminum ions in the second coordination sphere, which can be represented as -Si-O-Si*-(O-Al)$_3$, with the * representing the silicon atom of interest. It has been well established that an accurate framework Si/Al atom ratio can be obtained from the intensities of these peaks, provided at least two of the three higher n' peaks are observed. The $SiO_2/Al_2O_3$ ratio of the precursor zeolite was thus calculated from the peak intensities to be about 9.6±0.2. Curve b of FIG. 2 shows the silicon spectrum of the Y zeolite after treating it with ammonium hydroxide at 75° C. and from this spectrum it is clearly seen that the ratio of intensities of peak 3 to peak 4 has changed upon base treatment and the calculation of $SiO_2/Al_2O_3$ ratio yields 7.8 ±0.2. Such a reduction of the $SiO_2/Al_2O_3$ ratio of the framework unambiguously demonstrates the insertion of aluminum into the framework.

No silicon species was seen in the $^{29}Si$ NMR of the filtrate obtained upon base treatment. As mentioned earlier this filtrate showed no aluminum NMR either. Thus within the limits of detection, it can be concluded that neither siliceous nor aluminum species were leached out by the base treatment and the reduction of the non-framework aluminum species has resulted in the reinsertion of this aluminum into the zeolite framework.

Figure 3:
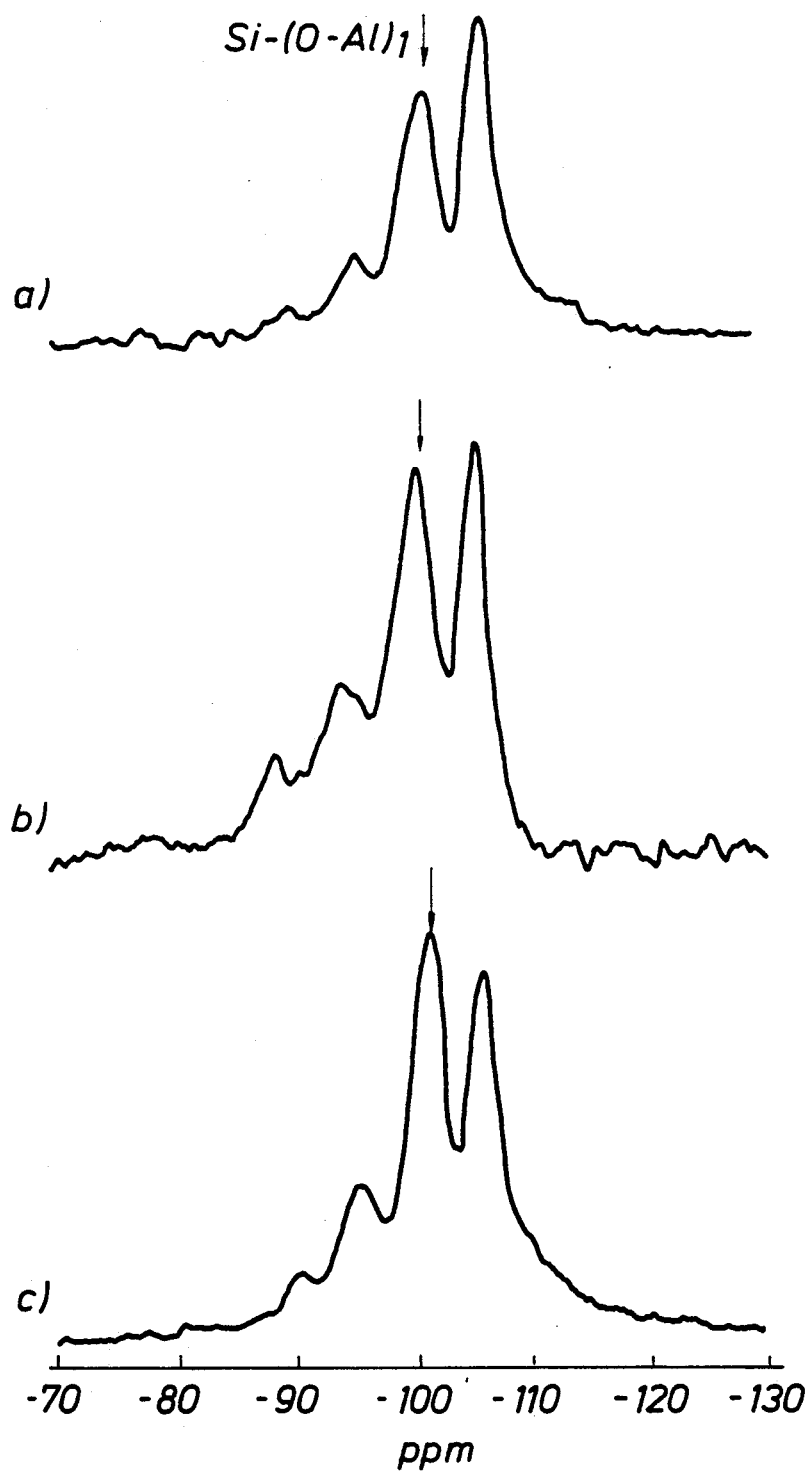
FIG. 3 represents the $^{29}Si$ NMR spectra of an untreated (curve a) Y zeolite, a sodium hydroxide treated (curve b) Y zeolite and an ammonium hydroxide treated (curve c) Y zeolite.

FIG. 3 represents the silicon NMR spectra of an untreated (curve a) Y zeolite of starting $SiO_2/Al_2O_3$ ratio of 11.0 ±0.2. Curve b corresponds to the zeolite treated with sodium hydroxide and curve c corresponds to the zeolite treated with ammonium hydroxide. The treatment of this zeolite with sodium hydroxide (as well as potassium hydroxide) leads to one distribution of Si/Al while treatment with ammonium hydroxide leads to a distinctly different distribution, even though the overall framework $SiO_2/Al_2O_3$ ratio obtained with all the three bases was determined to be 8.0 ±0.2. Evidence for such different distributions can be seen in the intensity of the peak representing silicon with one aluminum in the second shell [(-Si-O$_3$-*Si-O-Al-]. By treating with different bases the extent of reinsertion of aluminum as well as the site of insertion, can be controlled.

ILLUSTRATIVE EMBODIMENT

Realumination of Mordenite Acid Dealumination

Example IIA:

600 Grams of ammonium chloride was added to 2000 ml of a 0.5M HCl solution. The clear solution was heated to 50° C. 200 Grams of a sodium mordenite with a silica/alumina of 10.6 was added to the $NH_4Cl/HCl$ solution and stirred for 75 minutes. The white slurry was filtered warm and washed with 5000 ml of deionized water. The white solid was dried overnight at 110° C. and then calcined for 2 hours at 500° C. The filtrate was analyzed by $^{27}Al$ and $^{29}Si$ NMR. The sole species present in the aluminum NMR spectra of this filtrate was assigned to $Al(H_2O)_6Cl_3$. No silicon species was seen in the silicon NMR spectra of the filtrate.

Example IIB

A second mordenite sample was prepared in a similar fashion as the mordenite sample described above except that 2400 g of ammonium nitrate was used instead of ammonium chloride and a 0.5M $HNO_3$ solution was substituted for the hydrochloric acid.

Example IIC

A third mordenite sample was prepared in similar fashion as the second mordenite sample described above except that 2.0M $HNO_3$ was used.

Realumination

About 0.3–0.5 grams of the subject mordenite was slurried with 5 to 10 ml of aqueous base solution. The base solutions were prepared be adding either sodium hydroxide of potassium hydroxide to deionized water. Base concentrations ranging from 0.025 to 0.35M were tried and all were found to be effective in realuminating the mordenite. Ammonium hydroxide solutions were prepared by adding 0.8 to 1.0 ml of 30% ammonium hydroxide solution to 4.0 ml of deionized water. The mordenite solid was added to the base solution, vigorously slurried and maintained at 70°–80° C. for 16 hours. A typical pH of the mordenite slurry ranged from 10.5 to 12. After the treatment, the mordenite was filtered and the filtrate was retained for NMR experiments. The filtered solid was washed three time with hot deionized water, filtered and air dried at ambient temperature or at 80° C. in an oven, and then calcined.

As is exemplified in Illustrative Embodiment I, $^{27}$Al and $^{29}$Si NMR spectra were obtained on the untreated and base-treated mordenites. Non-framework aluminum and the $SiO_2/Al_2O_3$ ratio for the untreated and base-treated mordenites were calculated from NMR spectra. Properties for the untreated mordenites are shown in Table 1 below and for the base-treated mordenites in Table 2 below.

TABLE 1

| UNTREATED CALCINED MORDENITES | | |
|---|---|---|
| STARTING MORDENITE | NON-FRAMEWORK AL % OF TOTAL | $SiO_2/Al_2O_3$ RATIO |
| IIA | 19 ± 1 | 16.0 ± 0.6 |
| IIB | 20 ± 1 | 14.0 ± 0.6 |
| IIC | 18 ± 1 | 22.8 ± 0.6 |

TABLE 2

| BASE-TREATED MORDENITES | | | | |
|---|---|---|---|---|
| STARTING MORDENITE | BASE TREATMENT SALT MOLARITY | TEMP. | NON-FRAMEWORK AL % OF TOTAL | $SiO_2/Al_2O_3$ RATIO |
| IIA | NaOH 0.025 | 23° C. | 14 ± 1 | 14.0 ± 0.6 |
| IIA | NaOH 0.30 | 80° C. | 0.0 | 10.0 ± 0.6 |
| IIA | KOH 0.30 | 80° C. | 0.0 | 11.4 ± 0.6 |
| IIB | KOH 1.00 | 80° C. | 0.0 | 10.0 ± 0.6 |
| IIC | NH$_4$OH 1.86 | 80° C. | 0.0 | 19.5 ± 0.6 |
| IIC | NH$_4$OH 2.98 | 80° C. | 0.0 | 19.5 ± 0.6 |

As the above data clearly show, non-framework aluminum in the untreated mordenites has been incorporated into the silicon-aluminum framework by the base treatment process of the instant invention.

ILLUSTRATIVE EMBODIMENT III

Realumination of Zeolite L and Ferrierite

Dealumination by Steam Calcination

Commercial samples of ferrierite with a nominal $SiO_2/Al_2O_3$ ratio of 18 and L zeolite (potassium form) with a nominal $SiO_2/Al_2O_3$ ratio of 5.2 were used to prepare the starting zeolites. These were dealuminated by calcination of wet zeolites to effect a high temperature hydrolysis of the aluminum.

EXAMPLE IIIA

L Zeolite

The L zeolite was converted to the ammonium form by first ion exchanging with an aqueous 2.0M solution of lithium nitrate, followed by a subsequent exchange with a 3M aqueous solution of ammonium nitrate. The wet zeolite was then calcined at 500° C. for 2 hours.

EXAMPLE IIIB

Ferrierite

The ferrierite was synthesized utilizing an organic template and subsequently calcined wet to effectuate partial hydrolysis and dealumination of the framework.

Realumination

About 0.3–0.5 grams of the subject zeolite was slurried with 5 to 10 ml of aqueous base solution. Ammonium hydroxide solutions were prepared by adding 0.8 to 1.0 ml of 30% ammonium hydroxide solution to 4.0 ml of deionized water. The zeolite solid was added to the base solution, vigorously slurried and maintained at 70°–80° C. for 16 hours. A typical pH of the zeolite slurry ranged from 10.5 to 12. After the treatment, the zeolite was filtered and the filtrate was retained for NMR experiments. The filtered solid was washed three time with hot deionized water, filtered and air dried at ambient temperature or at 80° C. in an oven.

As is exemplified in Illustrative Embodiment I, $^{27}$Al and $^{29}$Si NMR spectra were obtained on the as obtained, the steam calcined and base-treated zeolites. Non-framework aluminum and the $SiO_2/Al_2O_3$ ratio for the as obtained, steam calcined and base-treated zeolites were calculated from NMR spectra. Properties for the as obtained and calcined zeolites are shown in Tables 3 and 5 below and for the base-treated zeolites in Tables 4 and 6 below.

TABLE 3

| UNTREATED L ZEOLITE | | | |
|---|---|---|---|
| AS RECEIVED | | STEAM CALCINED | |
| NONFRAMEWORK AL % OF TOTAL | $SiO_2/Al_2O_3$ RATIO | NONFRAMEWORK AL % OF TOTAL | $SiO_2/Al_2O_3$ RATIO |
| 2 ± 1 | 5.2 ± 0.3 | 14 ± 1 | 6.9 ± 0.3 |

TABLE 4

| | BASE-TREATED L ZEOLITE | | |
|---|---|---|---|
| BASE TREATMENT SALT MOLARITY | TEMP. | NON-FRAMEWORK AL % OF TOTAL | SiO$_2$/Al$_2$O$_3$ RATIO |
| NH$_4$OH 2.98 | 80° C. | 0 | 5.8 ± 0.5 |

TABLE 5

| UNTREATED FERRIERITE | | | |
|---|---|---|---|
| AS RECEIVED | | STEAM CALCINED | |
| NONFRAMEWORK AL % OF TOTAL | SiO$_2$/Al$_2$O$_3$ RATIO | NONFRAMEWORK AL % OF TOTAL | SiO$_2$/Al$_2$O$_3$ RATIO |
| 3 ± 1 | 18 ± 0.5[a] | 13 ± 1 | 21.0 ± 0.8 |

[a] The SiO$_2$/Al$_2$O$_3$ ratio is difficult to determine precisely for ferrierite because of the presence of crystallographically inequivalent tetrahedral sites.

TABLE 6

| | BASE-TREATED FERRIERITE | | |
|---|---|---|---|
| BASE TREATMENT BASE MOLARITY | TEMP. | NON-FRAMEWORK AL % OF TOTAL | SiO$_2$/Al$_2$O$_3$ RATIO |
| NH$_4$OH 2.98 | 80° C. | 0 | 17 ± 0.8[b] |

[b] See footnote [a] of Table 5

As the above data clearly show non-framework aluminum in the untreated zeolites has been incorporated into the silicon-aluminum framework by the base treatment process of the instant invention.

ILLUSTRATIVE EMBODIMENT IV

Realumination of Ion-Exchanged Aluminum in Mordenite

A sample of ammonium mordenite having a silica to alumina ratio of 15.8±0.6 was calcined wet at about 500° C. for two hours to produce a mordenite with a silica to alumina ratio of about 16.6±0.6.

Al$^{3+}$ Ion Exchange

Fifty grams of the above mordenite were slurried in one liter of deionized water and heated with stirring to 50° C. To this slurry were added 250 g of aluminum nitrate. The slurry was filtered warm after 16 hours and washed with one liter of deionized water. The procedure was repeated to ensure a high degree of Al$^{3+}$ ion-exchange. The product was then dried overnight at 110° C., and then calcined.

Realumination

About 0.3–0.5 grams of the dried mordenite above were slurried with 5 to 10 ml of an aqueous base solution which was prepared by adding either sodium hydroxide or potassium hydroxide to deionized water. Base concentrations ranging from 0.025M to 0.35M were tried and all were found to be effective in realuminating the mordenite. Ammonium hydroxide solutions were prepared by adding 0.8 to 1.0 ml of 30% ammonium hydroxide to 4.0 ml of deionized water. The mordenite was added to the base solution, vigorously slurried and maintained at 70°–80° C. for 16 hours. Typical pH of the zeolite slurry ranged from 10.5 to 12. After the treatment, the zeolite was filtered and the filtrate was retained for NMR experiments. The filtered solid was washed three times with hot deionized water, filtered and air dried either at ambient temperature or in an oven at 80° C.

As is exemplified in Illustrative Embodiment I, $^{27}$Al and $^{29}$Si NMR spectra were obtained on the as obtained, the dried, the calcined and base-treated mordenites. Non-framework aluminum and the SiO$_2$/Al$_2$O$_3$ ratio for the as obtained, calcined, aluminum ion-exchanged and calcined and base-treated zeolites were calculated from NMR spectra. Properties for the as obtained, dried and calcined zeolites are shown in Table 7 below and for the base-treated zeolites in Table 8 below.

TABLE 7

| UNTREATED MORDENITE | | | | | |
|---|---|---|---|---|---|
| AS RECEIVED | | AFTER CALCINING | | Al$^{3+}$ EXCHANGED AND CALCINED | |
| NONFRAMEWORK AL % OF TOTAL | SiO$_2$/Al$_2$O$_3$ RATIO | NONFRAMEWORK AL % OF TOTAL | SiO$_2$/Al$_2$O$_3$ RATIO | NONFRAMEWORK AL % OF TOTAL | SiO$_2$/Al$_2$O$_3$ RATIO |
| <1 | 15.8 ± 0.6 | 9 ± 1 | 16.6 ± 0.6 | 24 ± 1 | 18.2 ± 0.6 |

TABLE 8

| BASE-TREATED MORDENITE | | | |
|---|---|---|---|
| BASE TREATMENT SALT MOLARITY | TEMP. | NON-FRAMEWORK AL % OF TOTAL | SiO$_2$/Al$_2$O$_3$ RATIO |
| NH$_4$OH 2.98 | 80° C. | <1 | 13.8 ± 0.4 |
| NaOH 0.30 | 80° C. | 1 ± 0.5 | 14.0 ± 0.4 |

As the above data clearly show, non-framework aluminum which has been added to the mordenite by ion exchange has been incorporated into the silicon-aluminum framework by the base treatment process of the instant invention.

Illustrative Embodiment V

Similar results to those demonstrated above have been obtained when hydroxide solutions of calcium, magnesium, barium and strontium were utilized to realuminate zeolites.

We claim:

1. A process for increasing the framework aluminum content of a framework aluminum-deficient zeolite containing non-framework aluminum located in the zeolite wherein the non-framework aluminum is obtained by ion-exchanging the zeolite with an aqueous solution containing a dissolved aluminum salt, which process comprises contacting said zeolite with an ammonium hydroxide solution having a pH ranging from 8.5 to 13.

2. The process of claim 1 wherein said contacting is carried out at a temperature greater than about 25° C.

3. The process of claim 2 wherein the temperature is greater than 50° C.

4. The process of claim 3 wherein the temperature ranges between about 60° C. and about 90° C.

5. A process for increasing the framework aluminum content of a framework aluminum-deficient zeolite containing non-framework aluminum located in the zeolite wherein the non-framework aluminum is obtained by impregnating the zeolite with an aqueous solution containing a dissolved aluminum salt, which process comprises contacting said zeolite with an ammonium hydroxide solution having a pH ranging from 8.5 to 13.

6. The process of claim 5 wherein said contacting is carried out at a temperature greater than about 25° C.

7. The process of claim 6 wherein the temperature is greater than 50° C.

8. The process of claim 7 wherein the temperature ranges between about 60° C. and about 90° C.

9. The process of any one of claims 1 or 5 wherein the pH of the aqueous basic solution ranges from about 9 to about 12.

* * * * *